June 8, 1926.  
E. G. KIMMICH  
FLEXIBLE COUPLING  
Filed Sept. 5, 1922   2 Sheets—Sheet 2  
1,588,031

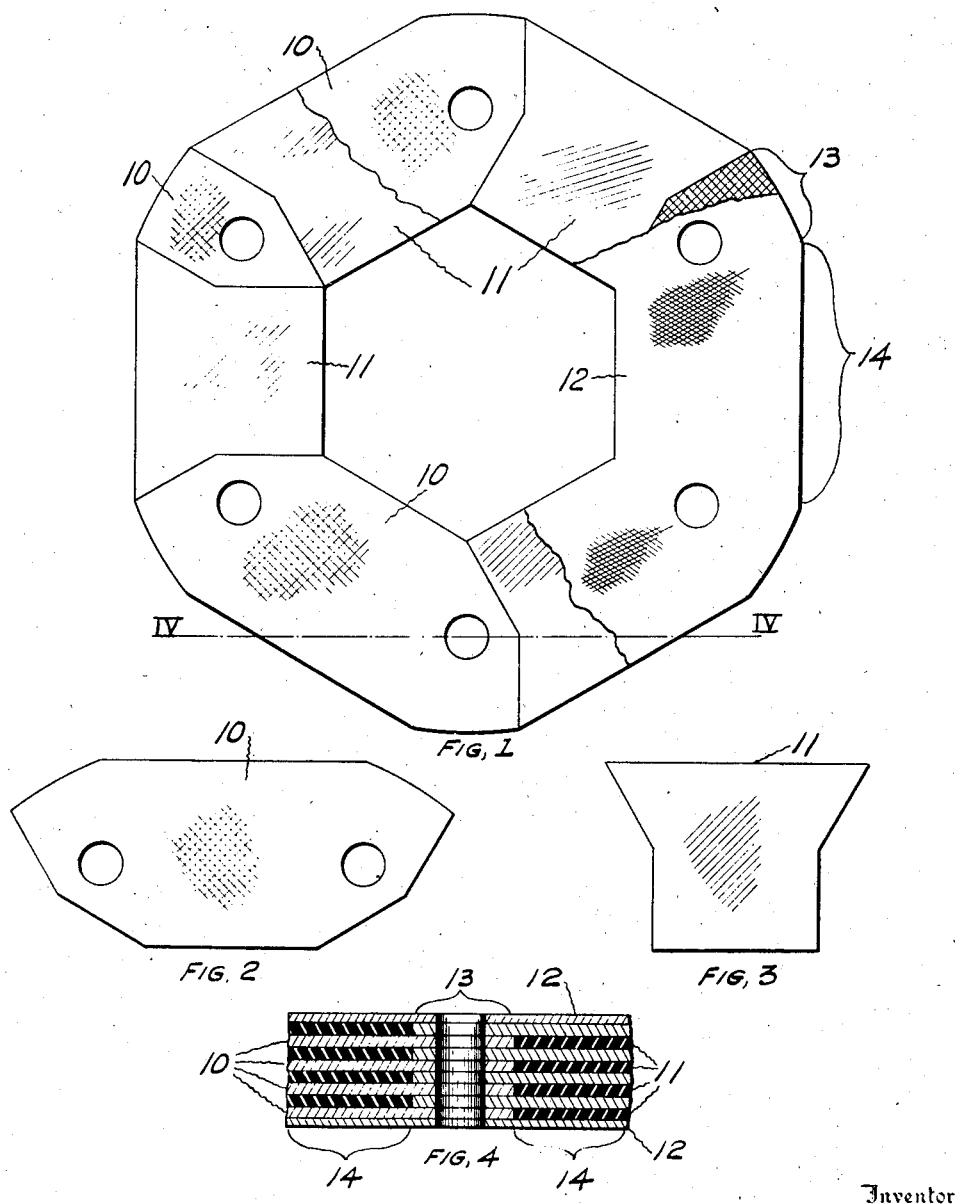

Inventor  
ELMER G. KIMMICH

Patented June 8, 1926.

1,588,031

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

FLEXIBLE COUPLING.

Application filed September 5, 1922. Serial No. 586,280.

My invention relates to flexible couplings and it is particularly directed to a disc that is adapted to be interposed between the driving and driven members of a flexible coupling.

The general types of discs that have heretofore been proposed for this service have usually embodied a plurality of layers of fabric built up in the form of a disc with suitably positioned holes for engaging the driving and driven members of the coupling.

The flexible discs herein considered are applicable to any one of a large class of couplings of conventional design that are interposed between the units of motor generator sets in automobile power transmission systems and in other similar apparatus. Because of the conventional character of couplings of this general class, it has been deemed sufficient to illustrate only the disc without the cooperating driving and driven members of the flexible coupling.

In service it has been found that discs of this general type wear completely through the compression portion of the disc while the material in the tension zone of the disc remains in perfect condition. A closer study of the reasons for the early destruction of this portion of the disc develops the fact that the successive layers of fabric are forced to move one against the other to a far greater extent in the compression portion of the disc than in any other portion because of the greater degree of flexure in the compression part of the disc. The destructive wear of the disc is therefore from flexure rather than from the energy that is transmitted through the disc.
One object of my invention is to produce a disc of this general type in which the portion of the disc that receives the maximum flexing action has flexible cushions interposed between the successive layers of fabric that greatly reduce the desctructive effects of the repeated bending of the portion of the disc between the drive holes. This interposed cushion of rubber, or other cushioning material is so closely united with the fabric that it absorbs a relatively large degree of movement between adjacent layers of fabric without separation of the plies of the disc and internal friction and heating of the discs is thereby avoided. In discs of the ordinary type the destructive action of these elements assumes very large proportions as previously set forth.

Another object of my invention is to provide a disc of relatively inexpensive construction, and of such a nature that a single unit can be used in lieu of the plurality of units that are required in the ordinary disc, since without this interposed layer of rubber or cushioning material the disc must necessarily be of limited thickness for satisfactory operation, whereas when this interposed layer of resilient material is used a disc of much greater thickness, and therefore of greater strength, can be constructed.

In the accompanying drawings:

Fig. 1 is a plan view, with parts broken away, of a disc constructed in accordance with my invention and adapted for use with flexible couplings of conventional design;

Fig. 2 is a plan view of one of the fabric elements entering into the construction of the disc shown in Fig. 1;

Fig. 3 is a plan view of one of the cushioning elements that are interposed between adjacent layers of fabric in the disc shown in Fig. 1;

Fig. 4 is a sectional edge view of the disc taken substantially on lines IV—IV of Fig. 1;

Figure 5:
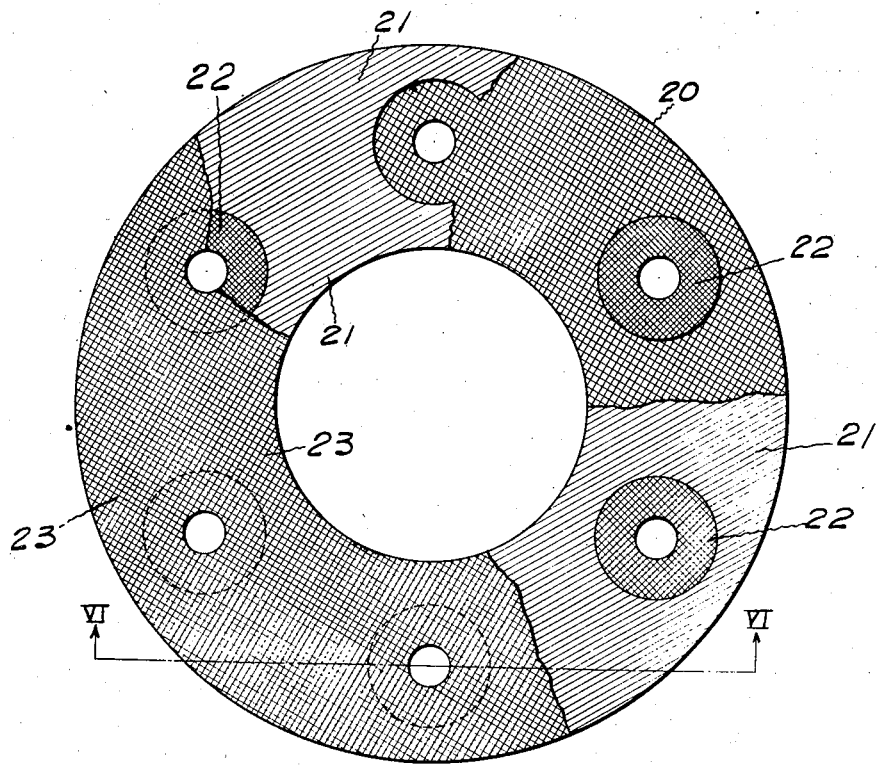
Fig. 5 is a view of a modified form of my disc shown partially in section with parts broken away and partially in elevation.

The flexible disc that is illustrated in Figs. 1 to 4, inclusive, of the drawing embodies a plurality of fabric links 10 that are built up in layers having the opposite ends of each link overlapping the ends of the adjacent links as shown in detail in Fig. 4. Fillers 11 of any suitable resilient material such as rubber or composition are assembled between the ends of adjacent link members in the same layer, in such manner that each layer of the disc embodies alternate fabric links 10 and cushioning members 11. Each succeeding layer is so arranged that the fabric links are constructed to provide a compact body of fabric adjacent to each of the driving holes of the disc and of alternate layers of rubber and fabric in the intermediate portion of the disc. This is particularly emphasized in the sectional view of Fig. 1 which also shows a fabric covering 12 that is placed on each side of the completed disc to provide an attractive external surface.

A disc built up in the manner described has a relatively incompressible zone 13 adjacent each of the driving holes and a flexible zone 14 that extends intermediate adjacent driving holes. It has been found in actual service that the interposition of cushioning strips 11 permits for greater relative movement of the several layers of fabric and thereby greatly prolongs the effective life of the disc. This construction also renders it possible to form a single unitary disc of sufficient thickness and strength to displace the three discs that are usually employed in a single driving connection.

Figure 6:
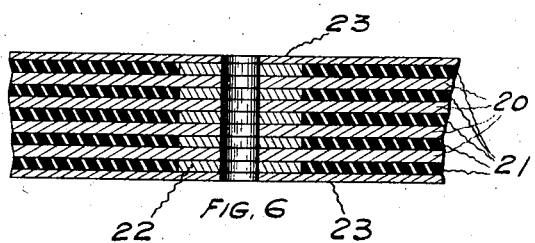
Fig. 6 is a sectional edge view taken substantially on lines VI—VI of Fig. 5.

Figs. 5 and 6 illustrate a modified form of my invention in which complete discs of fabric 20 are assembled alternately with layers of rubber composition 21. The rubber composition at each of the driving holes of the discs is replaced by a fabric washer 22. This particular assembly of fabric and rubber produces a disc in which the zone in the immediate vicinity of the driving holes is relatively incompressible to provide an exceptionally serviceable material for connecting the disc to the driving and driven members and in which the intermediate portion of the disc embodies zones of relatively great compressibility and of freely flexible material. This disc is also relatively inexpensive to construct, being preferably formed by superposing alternate layers of fabric and rubber and by positioning a fabric washer at each driving hole. The molding pressure that is applied to the disc in the process of vulcanization may be utilized to squeeze the rubber cushion material from between the washers and the fabric, or openings may be cut in the rubber cushion 21 for the washers 22 to form the disc substantially as shown. Fabric facing sheets 23 are applied to each side of the disc to improve its appearance.

It will be noted that the structure surrounding the bolt holes is of substantially one material. This material may be either fabric or rubberized fabric. The structure between the bolt holes includes more than one material. In the examples given, fabric and separable portions of rubber are employed.

Although I have illustrated and described only two applications of my invention to the construction of flexible couplings, it will be apparent that it could be applied to a great variety of distinct types of discs without departing from the spirit and scope of my invention. I therefore desire that only such limitations shall be imposed on my invention as are set forth in the accompanying claims.

What I claim is:

1. A composite disc for flexible couplings having a plurality of driving holes comprising relatively incompressible zones of a single material surrounding each of the driving holes and a flexible zone of more than one material intermediate the aforesaid driving zones.

2. A laminated disc comprising alternate layers of fabric and rubber composition in the compression zone of the disc and a relatively incompressible composition adjacent the clamped portion of the disc.

3. A unitary disc for flexible couplings comprising a plurality of layers of material, each layer comprising separated flexible links, and flexible cushioning filler strips extending between said flexible links.

4. A composite disc for flexible couplings embodying relatively incompressible zones of substantially one material adjacent the driving holes, and relatively flexible and compressible zones of substantially different materials intermediate said driving holes.

5. A composite disc for flexible couplings comprising superposed layers of fabric in the vicinity of the driving holes and alternate layers of fabric and resilient material between successive driving holes.

6. A composite disc for flexible couplings comprising layers of fabric and resilient material, and widely separated zones in which fabric replaces the resilient material to form relatively incompressible zones.

7. A composite member for flexible couplings having fabric connecting portions adapted to be secured to the parts of the coupling and intermediate portions of fabric and resilient materials of substantially greater flexibility than the material of the connecting portions of the member.

8. A composite disc for flexible couplings comprising alternate layers of relatively compressible and of relatively incompressible materials in the zones between the driving holes.

9. A flexible coupling comprising superposed layers of fabric and rubber composition inserts in the fabric between bolt holes providing spaced zones of relatively high flexibility.

10. A flexible coupling comprising a series of rubber inserts and layers of fabric superposed on the inserts, said inserts providing flexible zones alternating with less flexible clamp receiving zones.

11. A power transmission coupling member comprising a flexible structure of circumferentially spaced zones of rubber and a fibrous material, and compression zones comprising fabric between the flexible zones.

In witness whereof, I have hereunto signed my name.

ELMER G. KIMMICH.